United States Patent
Murray

(10) Patent No.: US 6,676,798 B1
(45) Date of Patent: Jan. 13, 2004

(54) METHOD OF MAKING REINFORCED COMPOSITE MATERIAL

(75) Inventor: Michael A. Murray, Shelby, OH (US)

(73) Assignee: Cooper Enterprises Inc., Shelby, OH (US)

( * ) Notice: Subject to any disclaimer, the term of this patent is extended or adjusted under 35 U.S.C. 154(b) by 188 days.

(21) Appl. No.: 09/940,782

(22) Filed: Aug. 28, 2001

(51) Int. Cl.[7] .............................. B32B 31/20; C09J 5/02
(52) U.S. Cl. .................. 156/307.4; 156/307.7; 156/308.2
(58) Field of Search .................. 156/272.2, 275.5, 156/275.7, 307.1, 307.4, 307.7, 308.2; 428/297.4, 299.4

(56) References Cited

U.S. PATENT DOCUMENTS

| | | | |
|---|---|---|---|
| 3,798,111 A | | 3/1974 | Lane et al. |
| 4,379,553 A | * | 4/1983 | Kelly ........................ 473/117 |
| 4,737,390 A | * | 4/1988 | Fricano et al. ............. 428/34.2 |
| 5,492,756 A | * | 2/1996 | Seale et al. ................. 428/326 |
| 5,601,679 A | | 2/1997 | Mulcahy et al. |
| 6,093,473 A | | 7/2000 | Min |
| 6,177,180 B1 | | 1/2001 | Bodine et al. |

* cited by examiner

Primary Examiner—Jeff H. Aftergut
Assistant Examiner—John T. Haran
(74) Attorney, Agent, or Firm—Brij K. Agarwal; Eckert Seamans Cherin & Mellott, LLC

(57) ABSTRACT

A reinforced composite material includes a laminate panel adhered to a strengthening panel with a layer of adhesive that is interposed therebetween. The strengthening panel includes a reinforcement embedded therein, and may be in the form of a sheet of fiberglass reinforced plastic (FRP). The layer of adhesive can include a coating of a contact adhesive applied to each of the laminate panel and the strengthening panel, or can be in the form of a hot melt glue or an epoxy adhesive. A method of forming the reinforced composite material includes forming the laminate panel, forming the reinforcing panel, and adhering the laminate panel to the reinforcing panel with a layer of adhesive. The adhering step can include applying and curing a layer of hot melt adhesive, applying coatings of a contact adhesive to the laminate panel and the reinforcing panel, and applying an epoxy adhesive, and/or other steps.

28 Claims, 4 Drawing Sheets

METHOD OF MAKING REINFORCED COMPOSITE MATERIAL

CROSS-REFERENCE TO RELATED APPLICATION

This application is related to co-pending U.S. patent application Ser. No. 09/941,169, filed Aug. 28, 2001, entitled "Reinforced Composite Material", now abandoned.

BACKGROUND OF THE INVENTION

1. Field of the Invention

The present invention relates generally to building materials and, more particularly, to a reinforced composite material that includes a laminate panel and a strengthening panel adhered to one another as well as to a method of forming the same.

2. Description of the Related Art

Laminate materials are generally well known. Such laminate materials are manufactured and sold under a variety of names, including the Formica® name which is owned by Formica Corporation of Cincinnati, Ohio, USA. Laminate materials of this type can also be referred to as high pressure laminate panels.

Among the ways in which a panel of laminate material can be used is as a kitchen countertop after being fixedly attached to a strong and substantially ridged substrate such as a wooden panel. As is understood in the relevant art, such a panel of laminate material is designed to have an attractive appearance yet be generally resistant to stains and to moderate amounts of heat such as are found in conjunction with cooking utensils.

As is understood in the relevant art, laminate materials are typically manufactured by heating and compressing a plurality of layers of resin impregnated paper, which cures the resin and causes the layers of paper to become laminated to one another and to form a sheet of laminate material. More specifically, a plurality of layers of Kraft paper are impregnated with a phenolic resin and are assembled into a stack. A decorative sheet of high-grade paper is impregnated with clear melamine resin and is placed atop the stack of resin impregnated Kraft paper. As is depicted generally in FIG. 1, the assembled stack 4 is then placed into a press 8 which compresses and heats the stack 4 to cause the aforementioned lamination process to occur. In a highly complex and tightly controlled process, the press 8 exerts pressure on the stack 4 in the range of about 800 to 1500 lbs./square inch, and additionally heats the stack 4 to a temperature in excess of about 250° Fahrenheit. After the stack 4 has been subjected to such pressures and temperatures in the press 8 for a period on the order of about an hour, the stack 4 is transformed into a laminate panel 12 having a decorative upper surface that is characterized by the aforementioned decorative sheet of high grade paper.

As is understood in the relevant art, the laminate panel 12 is a relatively brittle member, and thus its range of uses has been limited to situations in which the laminate panel 12 can be applied to a substrate having sufficient rigidity and strength to resist the potential for brittle breakage of the laminate panel 12. Alternatively, the laminate panel 12 can be installed onto a substantially rigid panel without inherent strength, such as a sheet of drywall or sheet-rock, in environments in which the sheet of laminate 12 will not be subjected to any meaningful loading.

It would be desirable, however, for laminate materials to be usable in environments in which substantial loading of the laminate materials is likely to occur without the need to provide a strong and rigid substrate. It thus would be desirable to provide a laminate panel that is appropriately structurally enhanced to permit its use in environments in which a sufficiently rigid and/or strong substrate for mounting the laminate is not provided. Such an enhancement for a panel of laminate material preferably would be capable of being individually tailored to provide specific properties of stiffness and strengthening to form a composite building member that is suited to the specific needs of particular applications.

It is additionally known that sheets or panels or fiberglass reinforced plastic (FRP) are employed in diverse commercial and domestic applications in which it is desired to provide a tear-resistant or puncture-resistant surface that is substantially waterproof and that is easily sanitized. Such panels of FRP can be generally stated as including a plurality of glass fibers that are embedded in a sheet of plastic such as a polyester copolymer or other such plastic.

Known panels of FRP are, however, relatively unattractive, and the use of FRP panels in commercial and domestic applications makes the surrounding environment correspondingly unattractive. More specifically, panels of FRP have noticeable bumps and a hard shiny outer surface that together provide a generally unsightly appearance. It is thus desired to provide an improved panel of FRP that is provided with an outer member having a relatively more attractive outer surface.

SUMMARY OF THE INVENTION

In view of the foregoing, a reinforced composite material includes a laminate panel that is adhered to a strengthening panel with a layer of adhesive that is interposed therebetween. The strengthening panel includes a reinforcement embedded therein, and may be in the form of a sheet of fiberglass reinforced plastic (FRP). The layer of adhesive can include a coating of a contact adhesive applied to each of the laminate panel and the strengthening panel, or the layer of adhesive additionally can be in the form of a hot melt glue or an epoxy adhesive.

An aspect of the present invention is to provide a reinforced composite material having the tear-resistant and strengthening properties of a panel of FRP and that has an attractive outer surface.

Another aspect of the present invention is to provide a reinforced composite material that includes an exterior-facing laminate panel and that is suited to installation onto a substrate that is less ridged and/or has less strength than a wooden panel.

Another aspect of the present invention is to provide a reinforced composite material having an outer surface that can be easily sanitized and that is relatively attractive.

Another aspect of the present invention is to provide a reinforced composite material having properties of strength, stiffness, and an appearance that can each be individually tailored to meet the specific needs of particular applications.

Another aspect of the present invention is to provide a reinforced composite material that is substantially capable of being readily assembled from generally available components.

Another aspect of the present invention is to provide a method of forming a reinforced composite material.

Another aspect of the present invention is to provide a method of adhering a laminate panel to a strengthening panel.

Another aspect of the present invention is to provide a method of interposing an adhesive between a laminate panel and a strengthening panel to form a reinforced composite material.

A further aspect of the present invention is to provide a reinforced composite material, the general nature of which can be stated as including a laminate panel, a strengthening panel including a reinforcement embedded therein, and a layer of adhesive disposed between the laminate panel and the strengthening panel to adhere the laminate panel and the strengthening panel together.

A further aspect of the present invention is to provide a method of forming a reinforced composite material, in which the general nature of the method can be stated as including the steps of forming a laminate panel by heating and compressing at least a first layer of paper and a quantity of resin, forming a strengthening panel by embedding a reinforcement in a layer of a binder material, and adhering the laminate panel to the strengthening panel with a layer of adhesive.

A further aspect of the present invention is to provide a method of forming a reinforced composite material, in which the general nature of the method can be stated as including the steps of providing a laminate panel, providing a strengthening panel, and adhering the laminate panel to the strengthening panel with a layer of adhesive.

BRIEF DESCRIPTION OF THE DRAWINGS

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENTS

Figure 1:
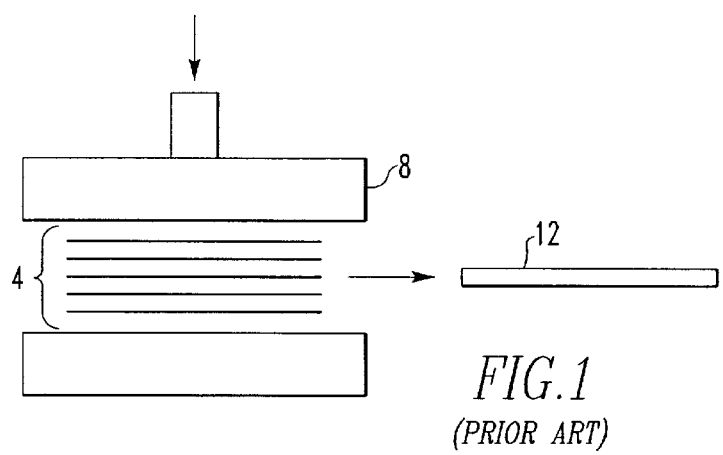
FIG. 1 is a prior art schematic view of a process for manufacturing a laminate panel.
Figure 2:
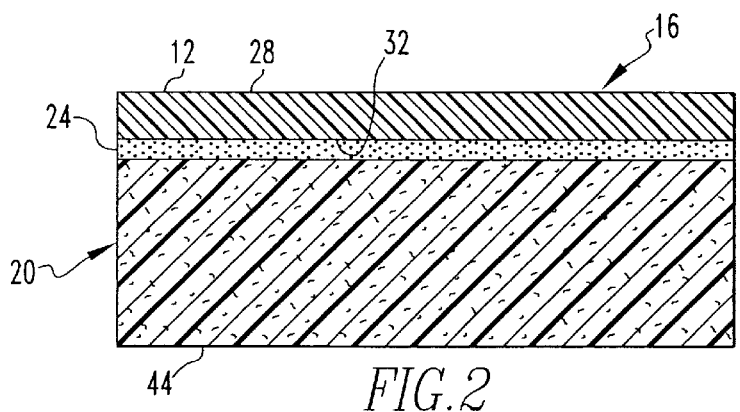
FIG. 2 is a cross sectional view of a portion of a panel of a first embodiment of a reinforced composite material in accordance with the present invention.

A portion of a panel of a first embodiment of a reinforced composite material 16 in accordance with the present invention is indicated generally in FIGS. 2–3 and 6–7. The reinforced composite material 16 can be generally stated as including a strengthening panel 20 that is adhered to the aforementioned laminate panel 12 with a layer of adhesive 24 that is interposed therebetween. As will be set forth more fully below, the reinforced composite material 16 advantageously possesses the properties of both the laminate panel 12 and the strengthening panel 20. Additionally, each of the laminate panel 12, the strengthening panel 20, and the layer of adhesive 24 can be individually selected or tailored to advantageously impart specific desirable properties to the reinforced composite material 16.

The laminate panel 12 can be any of a variety of known laminate materials that are sold under various names, including the name Formica® owned by Formica Corporation of Cincinnati, Ohio, USA. The laminate panel 12 includes an outer laminate surface 28 and an inner laminate surface 32 opposite one another. The outer laminate surface 28 is generally defined by the aforementioned decorative sheet of high grade paper that provides an attractive outer surface for the reinforced composite material 16. The laminate panel 12 can incorporate any of a variety of different types of high grade paper to give the outer laminate surface 28 any of a wide variety of desirable appearances. The inner laminate surface 32 preferably is sanded or otherwise roughened to enhance its adhesion with the layer of adhesive 24.

The layer of adhesive 24 can be made of any of a wide variety of appropriate adhesives, some of which will be set forth more fully below. The layer of adhesive 24 used in assembling the reinforced composite material 16 is generally in the nature of a contact cement, although other types of contact adhesives maybe employed. Such a contact cement maybe of a solvent base and include a blend of neoprene and phenolic materials, or alternately maybe of a water base.

The strengthening panel 20 can be broadly stated as including a sheet of plastic 52 (FIG. 4) having a plurality of fibers of reinforcing material 56 embedded therein. The fibers of reinforcing material 56 operate as a reinforcement that is fibrous and is embedded in the sheet of plastic 52. In this regard, it is understood that the strengthening panel 20 can be in the form of a sheet of fiberglass reinforced plastic (FRP) such as that sold under the name Structoglas® by Sequentia Incorporated of Cleveland, Ohio, USA, although other types of FRP can be employed.

The sheet of plastic 52 may be of many different compositions and particularly may be a polyester copolymer configuration that includes organic fillers and pigments. The sheet of plastic 52 may be of numerous other compositions including polyethylene, polypropylene, and other polymeric materials, depending upon the specific needs of the particular application. In this regard, it is understood that various plastics have various properties of stiffness, strength, elasticity, and the like. As such the sheet of plastic 52 is selected to have a composition and a thickness that will provide desired properties of stiffness, strength, elasticity, and the like to the reinforced composite material. In some configurations, the strengthening panel may be of a thickness on the order of about ⅛ inch.

The fibers of reinforcing material 56 are fibers of glass that are chopped and randomly oriented within the sheet of plastic 52. It is understood that the fibers of reinforcing material 56 may additionally or alternatively include fibers of other materials such as carbon, ceramic, and the like depending upon the specific needs of the particular application. The fibers of reinforcing material 56 may be of various lengths and diameters, and various amounts of the fibers may be employed, all of which can be varied upon the desired final characteristics of the reinforced composite material 16.

Figure 4:
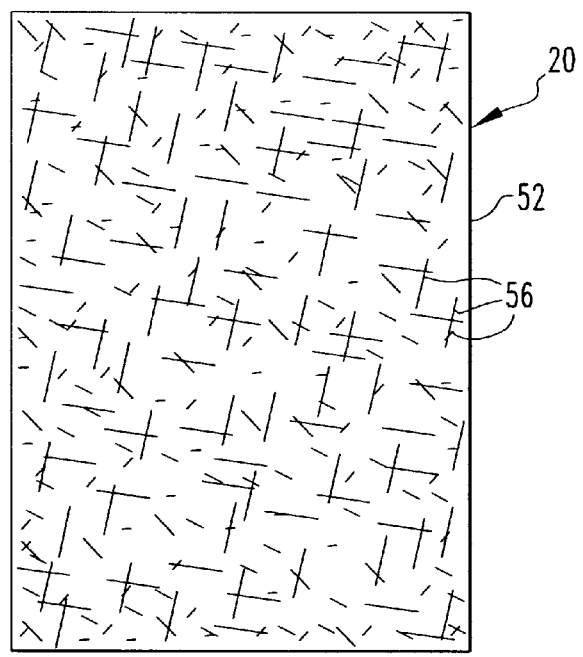
FIG. 4 is a top plan view of a first configuration of a strengthening panel that is incorporated into the first embodiment of FIG. 2.
Figure 5:
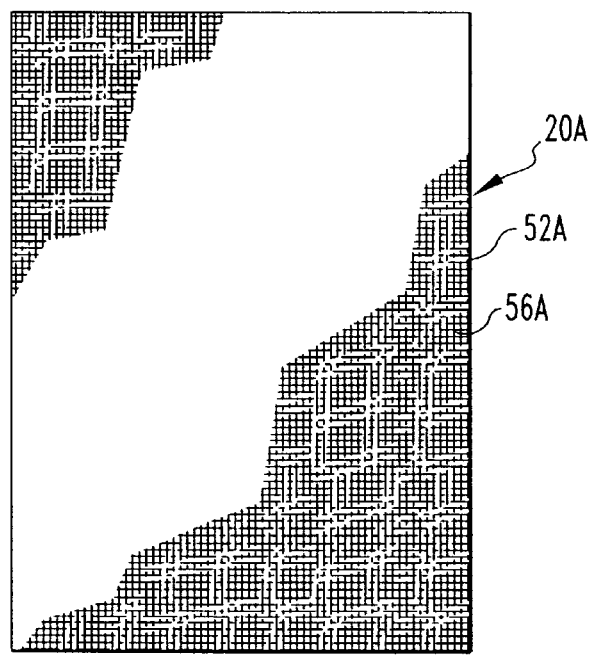
FIG. 5 is a top plan view of a second configuration of a strengthening panel that can be incorporated into the first embodiment of FIG. 2.

As can be seen in FIG. 4, the random orientation of the fibers of reinforcing material 56 provide reinforcing strength in substantially all directions parallel with the plane of the page of FIG. 4. It is understood that FIG. 4 generally depicts a first configuration of the strengthening panel 20. A second configuration of a strengthening panel 20A is depicted generally in FIG. 5. The strengthening panel 20A includes a sheet of plastic 52A having a plurality of fibers of reinforcing material 56A embedded therein. The fibers of reinforcing materials 56A may be of the same materials as set forth above and function as a reinforcement. More particularly, however, the fibers of reinforcing material 56A are not randomly oriented within the sheet of plastic 52A, and rather are woven (as generally depicted) or knit or otherwise fashioned into a pattern which, can provide relatively higher levels of strength along particularized directions parallel with the plane of the page of FIG. 5. It is understood that either of the strengthening panels 20 and 20A can be used in the reinforced composite material 16, and thus the strengthening panels 20 and 20A will be hereafter referred to collectively by the numeral 20.

The layer of adhesive 24 is advantageously selected so as to substantially not require the evaporation of water for curing after the laminate panel 12 and the strengthening panel 20 have been assembled together. In this regard, it is understood that both the laminate panel 12 and the strengthening panel 20 are substantially impervious to water in both liquid and vapor forms. As such, a significant obstacle to the assembly of the reinforced composite material 16 and the curing of the layer of adhesive 24 has been overcome by selecting an adhesive that either: (a) does not require the expulsion of water therefrom for curing, or (b) can become sufficiently cured and can substantially expel water prior to the assembly of the laminate panel 12 to the strengthening panel 20.

As indicated above, in the first embodiment of the reinforced composite material 16 the layer of adhesive 24 is a contact cement. The assembly process can be generally stated as including the application of coatings of the contact cement to both the laminate panel 12 and the strengthening panel 20. If the contact cement is water based, the water is permitted to be substantially expelled to cause a certain level of curing of the contact cement coatings prior to assembly of the laminate panel 12 to the strengthening panel 20. Similar results are achieved if the contact cement is solvent based.

Figure 3:
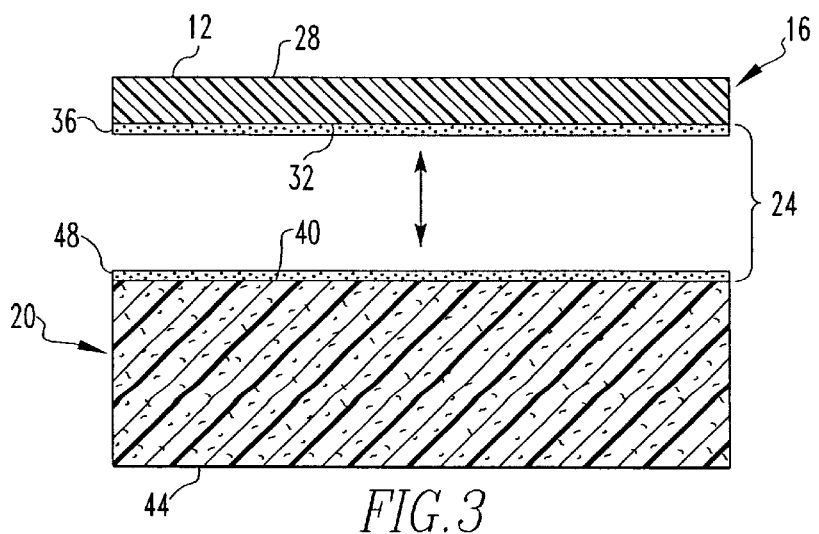
FIG. 3 is an exploded cross sectional view of the first embodiment of FIG. 2.
Figure 6:
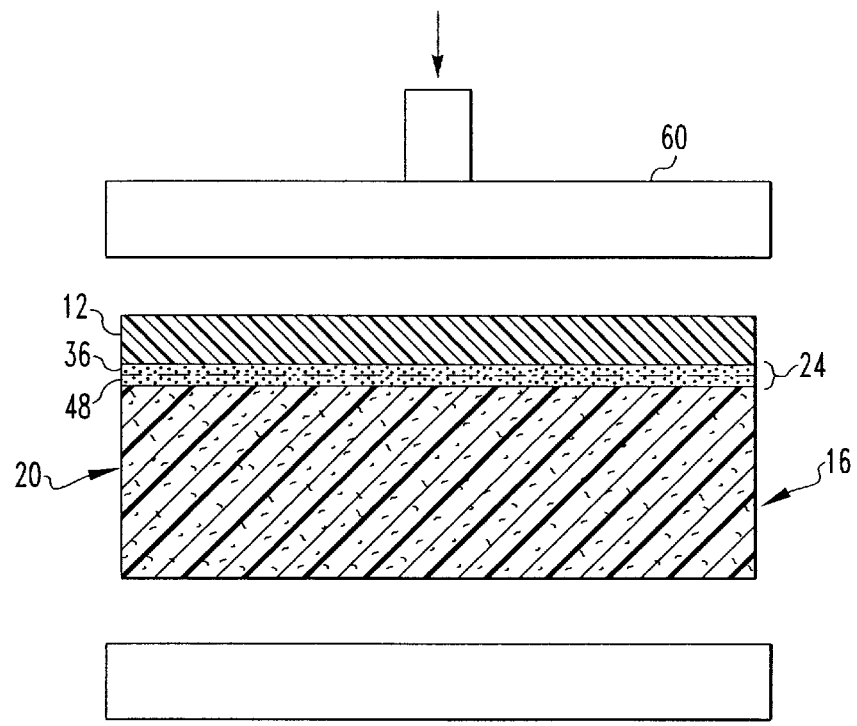
FIG. 6 is a schematic elevational view of a first process for forming the first embodiment of FIG. 2.
Figure 7:
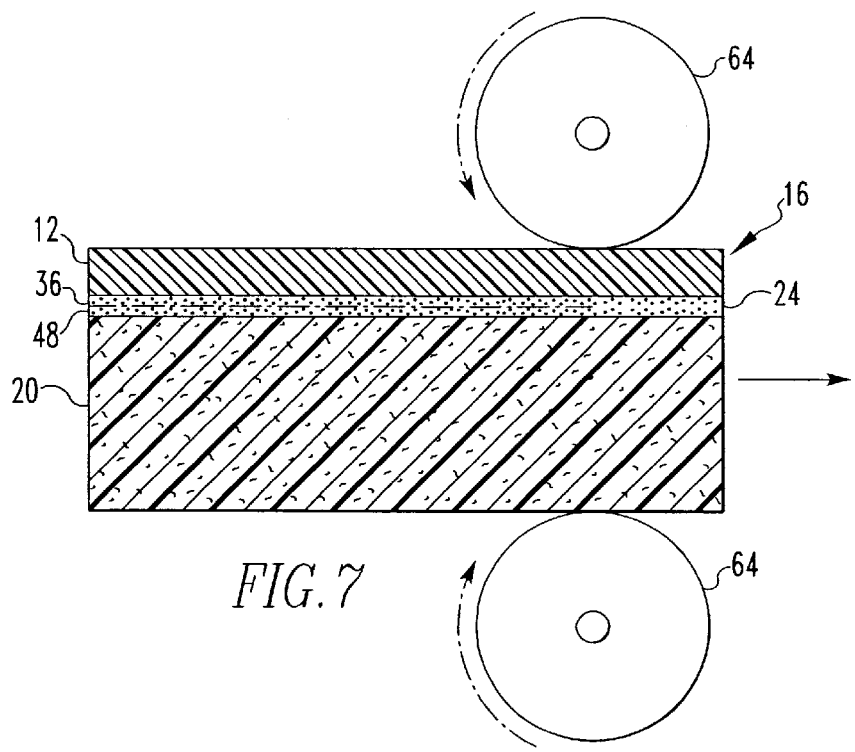
FIG. 7 is a schematic view of a second process for forming the first embodiment of FIG. 2.

As shown in FIGS. 3, 6, and 7, a first coating 36 of the adhesive, i.e., contact cement, is applied to the inner laminate surface 32 and is permitted to cure sufficiently to become tacky. Substantially simultaneously therewith, a second coating 48 of the adhesive is applied to an inner strengthening surface 40 of the strengthening panel 20. The second coating 48 is similarly permitted to cure sufficiently to become tacky. It is understood that during such initial curing the water or solvent basis of the adhesive is permitted to substantially evaporate, be consumed in some fashion, or otherwise be expelled.

The first and second coatings 36 and 48 are then engaged with one another whereby the first and second coatings 36 and 48 adhesively contact one another. As will be set forth more fully below, the first and second coatings 36 and 48 may undergo an additional compression step to fully engage the first and second coatings 36 and 48 with one another. By adhesively engaging the first and second coatings 36 and 48 with one another, the first and second coatings 36 and 48 together form the layer of adhesive 24 (FIGS. 2, 3, 6, and 7) that adheres the laminate panel 12 to the strengthening panel 20.

As indicated above, it may be desirable for the first and second coatings 36 and 48 to be compressively engaged with one another after their initial adhesive engagement with one another. As such, the initially adhered laminate panel 12 and strengthening panel 20 can be placed into a compression machine 60 (FIG. 6) of a known variety that applies a compressive force to compress together the laminate panel 12 and the strengthening panel 20 to thereby compressively engage the first and second coatings 36 and 48 to form the layer of adhesive 24 and to thereby form the reinforced composite material 16. Alternatively, the initially adhered laminate panel 12 and strengthening panel 20 may be passed between a pair of cooperative nip rollers 64 (FIG. 7) that similarly provide sufficient compressive force to the laminate panel 12 and the strengthening panel 20 to fully engage the first and second coatings 36 and 48 with one another to form the layer of adhesive 24 and to fully adhere the laminate panel 12 to the strengthening panel 20 and thereby form the reinforced composite material 16. Still alternatively, a single nip roller 64 can be engaged with a table (not shown) or other structure, either movable or stationary, upon which the arranged layers are disposed to provide appropriate compression thereto.

The compression machine 60 and the nip rollers 64 may or may not be heated, depending upon whether or not it is desirable to add heat to the particular adhesive employed to adhere the laminate panel 12 to the strengthening panel 20 or for other purposes, and additionally or alternatively depending upon the desired final characteristics of the reinforced composite material 16.

It thus can be seen that by forming the reinforced composite material 16 out of the laminate panel 12 and the strengthening panel 20 adhered with one another by the layer of adhesive 24, the reinforced composite material 16 has the attractive properties of the outer laminate surface 28 of the laminate panel 12 combined with the specifically-configured desired properties of stiffness, strength, elasticity, and the like of the strengthening panel 20. The reinforced composite material 16 is additionally easy to sanitize and thus makes its application in commercial and domestic settings particularly advantageous.

For instance, if the reinforced composite material 16 were applied to a wall (not shown) of a restaurant kitchen, the laminate panel 12 would provide a relatively attractive appearance to the kitchen. The reinforced composite material 16 can be easily attached to the walls of the kitchen by applying an appropriate construction adhesive to an outer strengthening surface 44 of the strengthening panel 20 (which is opposite the inner strengthening surface 40) and applying the outer strengthening surface 44 with the construction adhesive to the wall that is desired to be covered by the reinforced composite material 16. With the reinforced composite material 16 applied to the wall as such, the laminate panel 12 will be resistant to stains and moderate levels of heat, can be easily sanitized and provides an attractive appearance. Additionally, the strengthening panel 20 advantageously resists fracture of the laminate panel 12 and perforation or other destruction of the wall in the event that objects fall or are thrown against the wall, such as cans, machinery, and the like.

Since the specific material properties of the sheet of plastic 52 and the fibers of reinforcing material 56 can each be specifically configured to provide desired properties of stiffness, strength, elasticity, and the like to the reinforced composite material 16 that are suited to the specific needs of the particular application, the reinforced composite material 16 can advantageously be configured to possess numerous varied and highly specific material properties without the need to alter or specifically configure the highly complex and tightly controlled process by which the laminate panel 12 is manufactured. The reinforced composite material 16 thus advantageously provides a useful and durable material that possesses specifically configured material properties and that resists destruction of the substrate material and that permits relatively less strong and/or rigid materials such as drywall and the like to be used as a substrate in a relatively punishing environment such as on the walls of a commercial kitchen. It is understood, however, that the reinforced composite material 16 can be advantageously applied to other structures and substrates and can be used in numerous applications.

Figure 8:
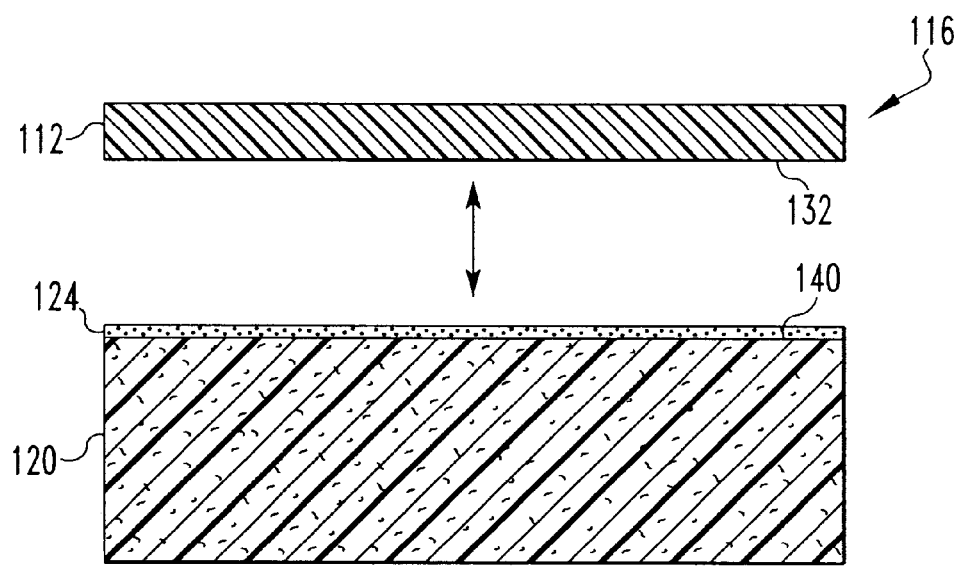
FIG. 8 is an exploded sectional view of a portion of a reinforced composite material in accordance with a second embodiment of the present invention.

A second embodiment of a reinforced composite material 116 depicted generally in FIG. 8 includes a laminate panel 112 adhered to a strengthening panel 120 with a layer of adhesive 124 that is in the form of a hot melt glue. As is understood in the relevant art, a hot melt glue typically is stored in a solid form but is melted when it is desired to be used to adhere one structure to another. In the embodiment depicted generally in FIG. 8, the hot melt glue that makes up the layer of adhesive 124 is configured as a thin rolled sheet when in its solid form.

The layer of adhesive 124 in its sheet form is positioned on the inner strengthening surface 140 of the strengthening panel 120 and is heated by known methods to liquefy the sheet of hot melt glue to form the layer of adhesive 124. After such liquification, the inner laminate surface 132 of the laminate panel 112 is adhesively engaged with the layer of adhesive 124. If desired, the adhered laminate panel 112 and strengthening panel 120 may be passed through the compression machine 60 (FIG. 6) or the pair of nip rollers 64 (FIG. 7) to fully engage the laminate panel 112 with the strengthening panel 120.

In other embodiments, the layer of adhesive 124 may be initially disposed on the laminate panel 112 prior to being heated, and in still other embodiments the layer of adhesive 124 may be interposed between the laminate panel 112 and the strengthening panel 120 prior to heating. In this regard, the layer of adhesive 124 that is interposed between the laminate panel 112 and the strengthening panel 120 may be heated by passing the arranged layers through a heated compression machine 60 (FIG. 6) or a heated pair of nip rollers 64 (FIG. 7).

In still other embodiments, the layer of adhesive 124 may be in the form of a film adhesive that may be of a supported or an unsupported type. Many of these adhesives may be in the form of a "B" staged or partially cured adhesive that may additionally be applied to a firm or carrier. The layer of adhesive 124 is cut to shape, placed in position on the laminate panel 112 or the strengthening panel 120, and a release tape (not shown) removed from the adhesive layer 124 (if configured with such a release tape). After the layer of adhesive 124 is interposed between the laminate panel 112 and the strengthening panel 120, the arranged layers are compressed and the compression machine 60 (FIG. 6) or the pair of nip rollers 64 (FIG. 7) and may be heated as appropriate to cure the layer of adhesive 124.

Depending upon the specific adhesive employed, cooling of the layer of adhesive 124 causes the layer of adhesive 124 to cure and to fixedly adhere the laminate panel 112 to the strengthening panel 120. Such curing results at least in part from the solidification of the liquid adhesive. Some hot melt adhesives have an additional curing agency or aspect, however, whereby the adhesive is moisture-cured. More specifically, water in the environment surrounding the adhesive causes a cross-linking which results in an additional level of curing of the adhesive that does not permit subsequent re-melting of the adhesive. Such a dual-reactive hot melt adhesive is manufactured under the name ReacTITE® by Franklin International of Columbus, Ohio, USA. Such an adhesive is polyurethane reactive and is in large part composed of polyurethane materials. The layer of adhesive 124 may advantageously be such a moisture-cured or water-cured adhesive, although other appropriate adhesives may be used to provide specific qualities to the reinforced composite material 116 depending upon the specific needs of the application. It thus can be seen that the hot melt glue that makes up the layer of adhesive 124 has been specifically and advantageously selected to not require for curing the expulsion of water after the laminate panel 112 and the strengthening panel 120 have been assembled together.

It is further understood that the adhesive in solid form may be other than in the form of a sheet. Specifically, the solid adhesive may be in block form that must be melted and applied as a liquid to the inner strengthening surface 140 to form the layer of adhesive 124. Adhesives in such a form can be used to construct the reinforced composite material 116 without departing from the concept of the present invention.

Figure 9:
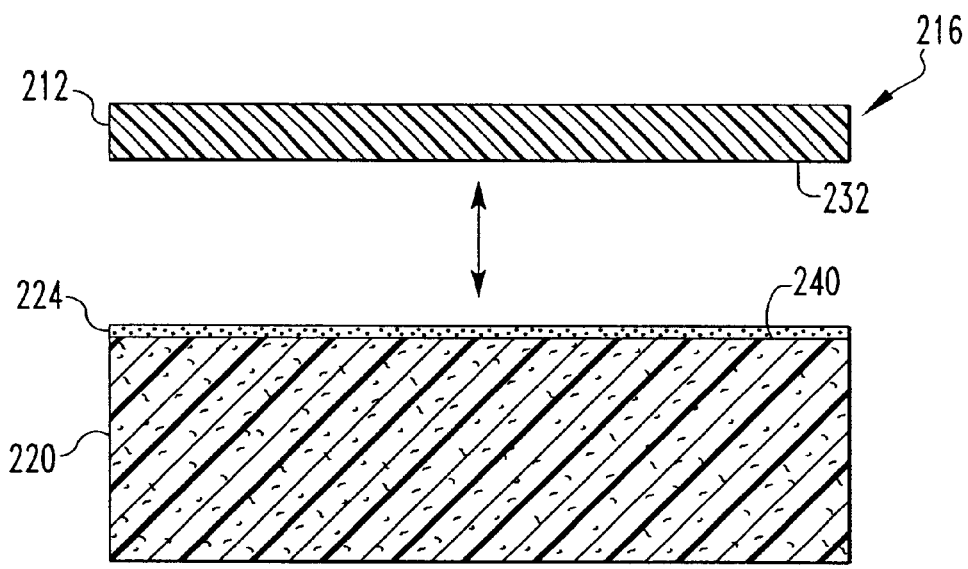
FIG. 9 is an exploded sectional view of a portion of a reinforced composite material in accordance with a third embodiment of the present invention.

A third embodiment of a reinforced composite material 216 is depicted generally in FIG. 9. The reinforced composite material 216 includes a laminate panel 212 that is adhered to a strengthening panel 220 with a layer of adhesive 224 interposed therebetween that is in the form of a viscous liquid. The viscous liquid of the layer of adhesive 224 is applied to one of the laminate panel 212 and the strengthening panel 220, with the other of the laminate panel 212 and the strengthening panel 220 then being applied to the layer of adhesive 224. In other embodiments the layer of adhesive may be otherwise interposed between the laminate panel 212 and the strengthening panel 220.

In one example of the third embodiment, the adhesive employed in forming the layer of adhesive 224 is an two-component adhesive mixture. More specifically, the two-component adhesive mixture results from mixing a first component of an adhesive with a second component of the adhesive, typically a type of resin and a hardener, respectively, to form the two-component adhesive mixture. Such two-component adhesive systems may include epoxy, urethane, polyester, acrylic, silicone, and the like. Moreover, such two-component adhesive systems may be either room temperature cured or high temperature cured.

In the example depicted in FIG. 9, the two-component adhesive mixture is applied to the inner strengthening surface 240 of the strengthening panel 220 to form the layer of adhesive 224, and the inner laminate surface 232 of the laminate panel 212 is adhesively engaged with the layer of adhesive 224. The initially assembled reinforced composite material 216 may then be subjected to the compression machine 60 (FIG. 6) or the pair of nip rollers 64 (FIG. 7) as appropriate to fully adhesively engage the laminate panel 212 with the strengthening panel 220. In this regard, the compression machine 60 or the pair of nip rollers 64 may be heated as appropriate.

If the layer of adhesive 224 is a two-component adhesive system, the layer of adhesive 224 may be generally self-curing, although the addition of heat for curing may be desirable, as indicated above, or may be necessary in cold environments. It thus can be seen that the two-component adhesive material that may make up the layer of adhesive 224 can be specifically and advantageously selected to not require for curing the expulsion of water after the laminate panel 212 and the strengthening panel 220 have been assembled together.

The adhesive layer 224 may alternately be made up of other adhesives, such as those that are configured to be cured with ultraviolet (UV) light impinged upon the layer of adhesive 224. In such an embodiment, at least one of the laminate panel 212 and the strengthening panel 220 is preferably at least partially translucent to UV light to permit the layer of adhesive 224 to cure. Depending upon the specific characteristics of the adhesive, however, curing of the layer of adhesive 224 may be accomplished by impinging UV light on the exposed edge of the layer of adhesive 224 or on the layer of adhesive 224 prior to it being interposed between the laminate panel 212 and the strengthening panel 220. It is understood that the adhesive that makes up the adhesive layer 224 may alternately be cured by application of other electromagnetic radiation thereto.

The adhesive employed in the layer of adhesive 224 additionally or alternatively may be configured to be cured via numerous other curing mechanisms, such as by the addition of oxygen and/or heat. Such adhesives typically may be in the form of a one-component adhesive having a catalyst or hardener as an integral part of the system and require no mixing. The layer of adhesive 224 may be formed of such adhesives depending upon the desired final characteristics of the reinforced composite material 116, the ease of manufacture thereof, as well as other factors.

After the layer of adhesive 224 has cured, the reinforced composite material 216 can be used as set forth herein. The equipment used for mixing the components of the layer of adhesive 224 and for applying the same to the inner strengthening surface 240 are generally known in the relevant art and are not specifically discussed herein.

While two different types of compression systems have disclosed herein for compressively engaging the laminate panel 12 with the strengthening panel 20, it is understood that numerous other types of compression systems can be employed without departing from the concept of the present invention. Moreover, while three different types of adhesives have been specifically described herein, it is understood that other suitable adhesives may be employed depending upon their specific properties. It thus can be seen that the present invention provides a reinforced composite material 16, 116, 216 that is both decorative and is strong enough to be installed onto a wide variety of substrates. Moreover, the laminate panel 12, 112, 212 and the strengthening panel 20, 120, 220 can be specifically selected to impart individualized characteristics or properties to the reinforced composite material 16 to suit such reinforced composite material to specific needs of particular applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of forming a reinforced composite material, the method comprising the steps of:

forming a laminate panel by heating and compressing at least a first layer of paper and a quantity of resin;

forming a strengthening panel by embedding a reinforcement in a layer of a binder material; and adhering the laminate panel to the strengthening panel with a layer of adhesive, said adhering including applying a layer of a hot melt adhesive between the laminate panel and the strengthening panel and curing the layer of hot melt adhesive.

2. The method as set forth in claim 1, further comprising the step of embedding a plurality of fibers of a reinforcing material in a sheet of plastic to form the strengthening panel.

3. The method as set forth in claim 1, in which the step of forming a strengthening panel includes the step of providing a sheet of fiberglass reinforced plastic.

4. The method as set forth in claim 1, in which the step of curing includes the step of heating the layer of hot melt adhesive.

5. The method as set forth in claim 4, in which the step of curing includes the step of cooling the layer of hot melt adhesive.

6. The method as set forth in claim 4, in which the step of curing includes the step of placing the layer of hot melt adhesive into an environment that includes water.

7. The method as set forth in claim 1, further comprising the step of applying a compressive force to at least one of the laminate panel and the strengthening panel.

8. The method as set forth in claim 7, in which the step of applying a compressive force includes the step of compressing the laminate panel and the strengthening panel together with a compression machine.

9. The method as set forth in claim 7, in which the step of applying a compressive force includes the step of engaging at least one of the laminate panel and the strengthening panel with at least a first nip roller.

10. The method as set forth in claim 7, in which the step of applying a compressive force includes the step of compressing the laminate panel and the strengthening panel together between a pair of nip roller.

11. The method as set forth in claim 7, further comprising the step of heating the layer of adhesive.

12. The method as set forth in claim 1, further comprising the step of applying the layer of adhesive to one of the laminate panel and the strengthening panel and engaging the other of the laminate panel and the strengthening panel in the layer of adhesive.

13. The method as set forth in claim 1, in which the step of adhering includes the steps of applying a first coating of an adhesive to the laminate panel, applying a second coating of the adhesive to the strengthening panel, and engaging the first and second coatings together.

14. The method as set forth in claim 13, further comprising the step of curing the first and second coatings.

15. A method of forming a reinforced composite material, the method comprising the steps of:

providing a laminate panel having at least a first sheet of paper and a quantity of resin;

providing a strengthening panel having a plurality of fibers of a reinforcing material embedded in a sheet of plastic; and adhering the laminate panel to the strengthening panel with a layer of adhesive, said adhering including one of applying a layer of a hot melt adhesive between the laminate panel and the strengthening panel and applying a layer of a contact cement to each of the laminate panel and the strengthening panel.

16. The method as set forth in claim 15, in which said adhering includes applying a layer of hot melt adhesive between the laminate panel and the strengthening panel and curing the layer of hot melt adhesive.

17. The method as set forth in claim 16, in which the step of curing includes the step of heating the layer of hot melt adhesive.

18. The method as set forth in claim 17, in which the step of curing includes the step of cooling the layer of hot melt adhesive.

19. The method as set forth in claim 17, in which the step of curing includes the step of placing the layer of hot melt adhesive into an environment that includes water.

20. The method as set forth in claim 15, further comprising the step of applying a compressive force to at least one of the laminate panel and the strengthening panel.

21. The method as set forth in claim 20, in which the step of applying a compressive force includes the step of compressing the laminate panel and the strengthening panel together with a compression machine.

22. The method as set forth in claim 20, in which the step of applying a compressive force includes the step of engaging at least one of the laminate panel and the strengthening panel with at least a first nip roller.

23. The method as set forth in claim 20, in which the step of applying a compressive force includes the step of compressing the laminate panel and the strengthening panel together between a pair of nip roller.

24. The method as set forth in claim 20, further comprising the step of heating the layer of adhesive.

25. The method as set forth in claim 15, further comprising the step of applying the layer of adhesive to one of the laminate panel and the strengthening panel and engaging the other of the laminate panel and the strengthening panel in the layer of adhesive.

26. The method as set forth in claim 15, in which the step of adhering includes the steps of applying a first coating an adhesive to the laminate panel, applying a second coating of the adhesive to the strengthening panel, and engaging the first and second coatings together.

27. The method as set forth in claim 26, in which the adhesive is a contact adhesive.

28. The method as set forth in claim 26, further comprising the step of curing the first and second coatings.

* * * * *

UNITED STATES PATENT AND TRADEMARK OFFICE
CERTIFICATE OF CORRECTION

PATENT NO. : 6,676,798 B1
DATED : January 13, 2004
INVENTOR(S) : Michael A. Murray It is certified that error appears in the above-identified patent and that said Letters Patent is hereby corrected as shown below:

Column 5,
Line 15, delete the "," after "which".

Column 12,
Line 11, insert -- of -- after "coating".

Signed and Sealed this

Sixth Day of July, 2004

JON W. DUDAS
*Acting Director of the United States Patent and Trademark Office*